United States Patent [19]

Massari et al.

[11] Patent Number: 4,489,464

[45] Date of Patent: Dec. 25, 1984

[54] U-PROFILED IMPROVED HOSE CLAMP

[76] Inventors: Renzo Massari; Sergio Massari, both of Via Padova, 217, 20127 Milan, Italy

[21] Appl. No.: 396,071

[22] Filed: Jul. 7, 1982

[51] Int. Cl.³ .................. B65D 63/00; F16L 33/04
[52] U.S. Cl. ........................... 24/279; 24/20 LS; 24/280; 24/283; 285/252
[58] Field of Search ............. 24/279, 280, 283, 282, 24/20 R, 20 S, 20 TT; 285/252, 242, 244

[56] References Cited

U.S. PATENT DOCUMENTS

| | | | |
|---|---|---|---|
| 1,568,043 | 1/1926 | Anderson | 24/279 |
| 1,782,476 | 11/1930 | Parker | 24/20 LS |
| 2,073,294 | 3/1937 | Caillau | 24/280 |
| 2,074,643 | 3/1937 | Domenego | 285/252 |
| 2,482,374 | 9/1949 | Ruschmeyer | 24/280 |
| 3,131,444 | 5/1964 | Manning | 24/279 |

FOREIGN PATENT DOCUMENTS 1140775  8/1957  France ................. 24/283

*Primary Examiner*—Victor N. Sakran
*Attorney, Agent, or Firm*—Joseph W. Molasky & Assocs.

[57] ABSTRACT

The invention refers to hose clamps of the U-profiled kind and consisting of steel wire. The hose clamp is double U-profiled and presents both ends U-profiled in order to engage a tension auxiliary spiral spring.

1 Claim, 4 Drawing Figures

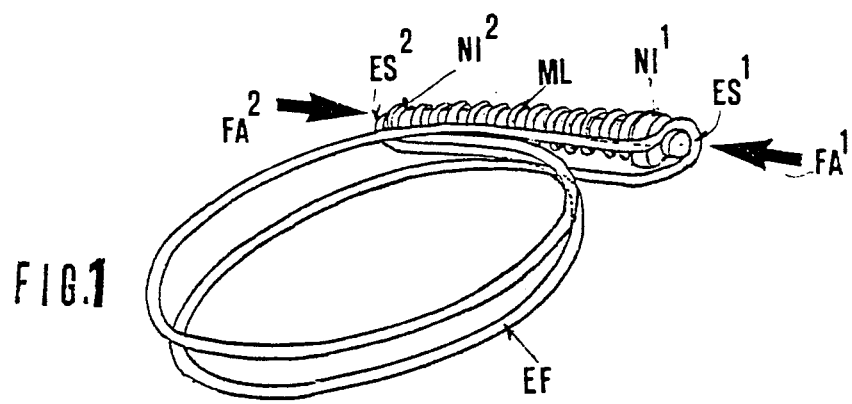
FIG.1
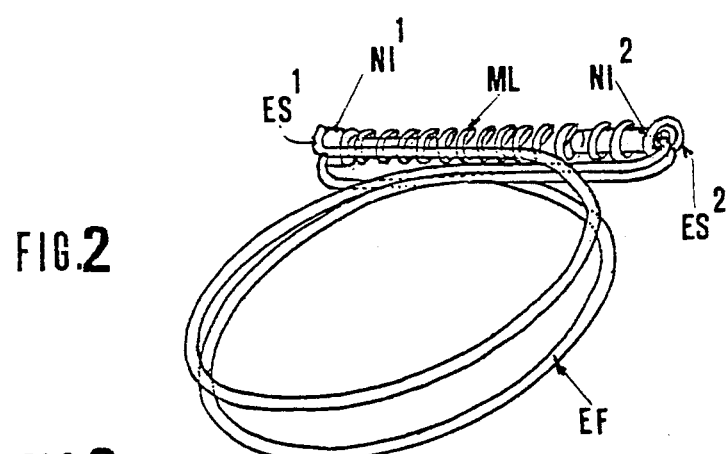
FIG.2
FIG.3     FIG.4
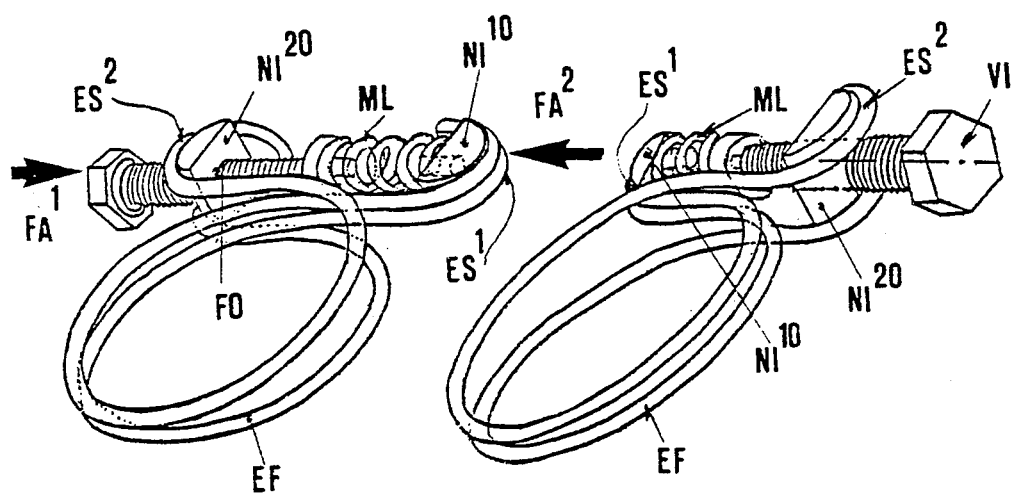

U-PROFILED IMPROVED HOSE CLAMP

FIELD OF THE INVENTION

The invention refers to hose clamp consisting of steel wire and presenting a U-profile.

DESCRIPTION OF THE PRIOR ART

A lot of U-profiled metallic wire clamps are known for rigidly clamping the ends of a tubular hose. The known clamps are unable to recover the "play" resulting from a degradation of the hose material and/or from the thermic excursions thereof. In effect the clamping effect resides in the known clamps only on the intrinsic elasticity of the U-profiled wire clamp.

SUMMARY OF THE INVENTION

In order to overcome the above stated drawback and to provide certain inedited advantages the present invention provides a U-profiled hose clamp characterized in that it presents a double U-profile with its ends U-profiled so as to engage each a nipple, between the nipples being located an auxiliary spiral spring so as to recover automatically any play resulting from the thermic strokes as well from the chemical degradation of the tube material to be clamped.

One of the most important features of the hose clamp according to this invention resides in its insensitiveness to vibrations and automatic recovery of any play resulting from thermic excursions in the material and/or chemical degradation of the latter.

Another important feature of the invention hose clamp resides in the fact that with the same U-profiled clamp wire it is possible to provide a number of hose clamps with a wide range of fastening features by changing only the auxiliary spiral spring.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIGS. 1 and 2 are two perspective views of a first embodiment of a hose clamp according to this invention;

FIGS. 3 and 4 are two representations as FIGS. 1 and 2 of a further embodiment.

Like references refer to like parts through the different views and in both embodiments.

DESCRIPTION OF THE PREFERRED EMBODIMENT

The hose clamp EF of wire is according to this invention shaped with double U-profile, the ends $ES^1$—$ES^2$ of the wire clamp being U-profiled in order to engage each resp. a nipple $NI^1$—$NI^2$. Between the two nipples an auxiliary compression spiral spring ML is hooked, the latter remaining located thanks to its compression intrinsic elasticity.

For assembling the hose clamp it is necessary only to approach with the hands or an appropriate tool the ends $ES^1$—$ES^2$ towards one another as shown by the arrows $FA^1$—$FA^2$ and thereafter to engage the tube ends of the tube to be clamped. The clamping effect results from the synergistic action of the wire spring a double U-profiled collar (clamp) and of the auxiliary spring ML.

With reference to the embodiment according to the FIGS. 3 and 4 a nipple $NI^{10}$ is half-moon profiled and the other half-moon profiled nipple $NI^{20}$ is machined with a threaded hole FO engaged by an adjustment screw VI.

Both the half-moon profiled nipples are machined so as to cooperate with the clamp so as to locate the wire in order to interdict any relative movement thereof.

The tapered cylindrical end of the adjustment screw VI cooperates with a blind hole formed in an intermediary or third nipple as apparent from the FIG. 4.

It is apparent that by screwing or unscrewing the adjustment screw VI the compression tension of the spring is modified and the elastic clamping effect of the hose clamp is increased or descreased.

The assembling mode and operation of this second embodiment is like the first embodiment of FIGS. 1 and 2.

The preceding description makes it evident that the mentioned objects of the invention have been fully attained. In the light of the disclosure changes and modifications within the true spirit and scope of the invention will occur to others, and accordingly it is not desired that the scope of the invention be restricted except as is required by the appended claims.

I claim:

1. In a self-tightening encircling clamp, the combination of a body portion forming a closed loop of relatively stiff spring-like resilient wire, said wire loop being flattened to bring its two opposite sides into a parallel spaced relationship, said sides being rolled into a circle of substantially less diameter than the outside diameter of the smallest hose upon which the clamp is to be used, a first extremity of said loop configuration being bent to form a U-shaped loop and the second extremity being bent to form a U-shaped profile; a screw-shaped adjusting means to increase or decrease the size of said loop structure, said screw presenting a tapered terminal portion, an intermediary nipple presenting on its front side a blind hole and formed to receive on the side opposite said front side a centering finger; said screw being screwed to said first nipple and cooperating with said tapered terminal portion and with said intermediary nipple; and a spring mounted between said second extremity and said intermediary nipple.

* * * * *